No. 874,922. PATENTED DEC. 31, 1907.
J. BAKER.
VAULT LIGHT CONSTRUCTION.
APPLICATION FILED MAR. 29, 1907.
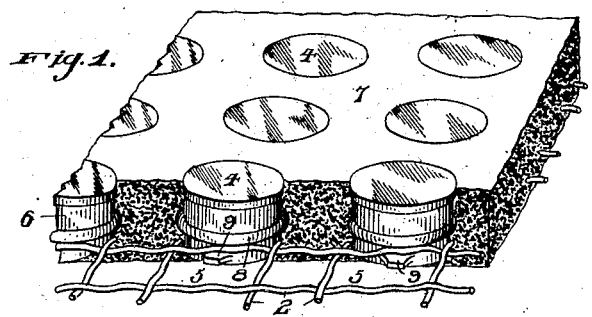
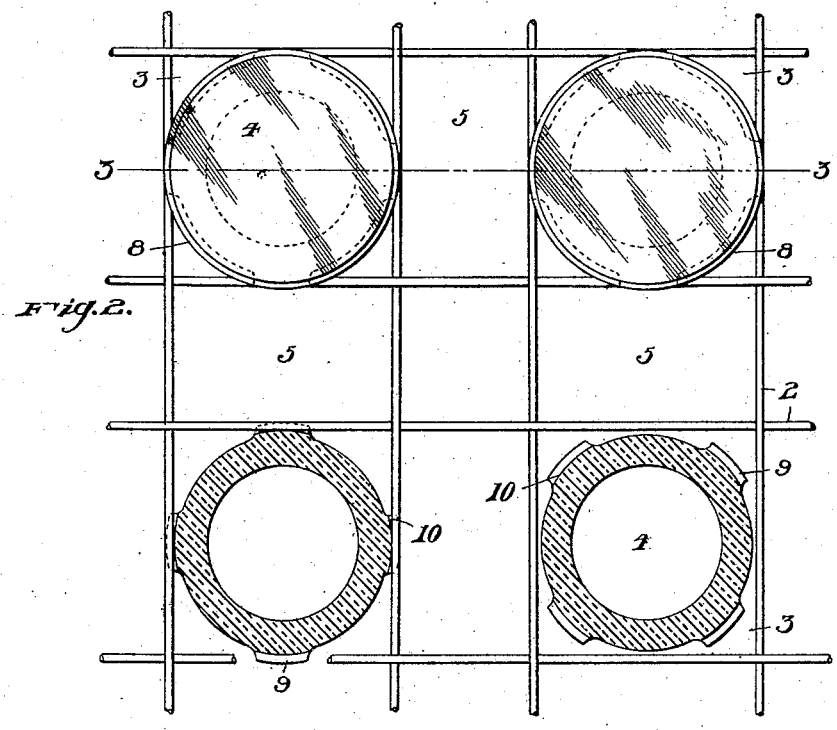
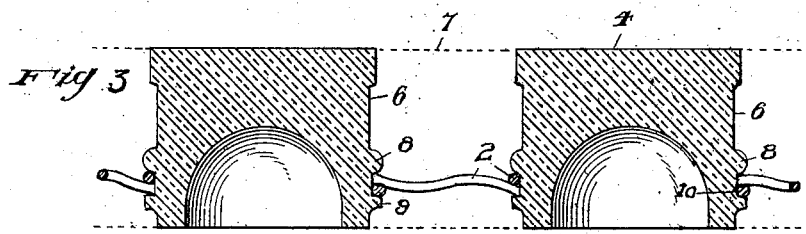

UNITED STATES PATENT OFFICE.

JULIUS BAKER, OF ALLEGHENY, PENNSYLVANIA.

VAULT-LIGHT CONSTRUCTION.

No. 874,922.  Specification of Letters Patent.  Patented Dec. 31, 1907.

Application filed March 29, 1907. Serial No. 365,243.

*To all whom it may concern:*

Be it known that I, JULIUS BAKER, resident of Allegheny, in the county of Allegheny and State of Pennsylvania, have invented certain new and useful Improvements in Vault-Light Construction, of which the following is a specification.

This invention relates to the construction of light admitting cement side walks and other surfaces, and one object is to provide improved means for embedding and securing therein the light admitting glasses, commonly known as deck-lights or bull's eyes.

A further object is to provide for accurately mounting the glasses in the frame or skeleton reinforcement so that they are held in proper position with relation to each other and to the finished surfaces of the cement when the latter is applied.

In the accompanying drawings, Figure 1 is a perspective view of a portion of a cement surface or walk constructed in accordance with the invention. Fig. 2 is an inverted plan view of the skeleton frame or reinforcement with glasses attached thereto, one of the glasses being shown in section in the plane of the securing wires or rods, and another of the glasses having been given a quarter turn as when inserting or removing it. Fig. 3 is a vertical sectional view taken on line 3—3 of Fig. 2.

The reinforcement or skeleton consists of a series of heavy wires or rods 2, woven or interlocking in mesh fashion, and preferably arranged to form the separated square openings 3, in which the glasses 4 are secured. Between openings 3 are the narrower openings 5, but obviously the arrangement in this regard may be varied, being determined by the number of lights desired for a given area. Each of the lights or glasses 4 is of cylindrical form, with its vertical face contracted slightly beneath its upper end, as indicated at 6, to form a cavity into which the cement 7 fills for obtaining a secure hold. Beneath cavity 6 is the annular rib or flange 8, and beneath this flange and at equal distances apart are lugs 9. When the glass is in position, as in Fig. 3, the rods are confined between flange 8 and lugs 9, the glass being turned as shown in Fig. 2 to project lugs 9 beneath rods 2, so as to prevent the glass from being raised, while of course flange 8 holds the same against depression.

When inserting and removing the glass, it is given a partial turn, as indicated in the lower right hand part of Fig. 2, thus projecting lugs 9 toward the corners of space 3, when the glass may be freely raised. To provide a wedging and securing action, the face intermediate flange 8 and lugs 9 is bulged appreciably, as indicated at 10, so that when turned into secured position, the glass crowds against bars 2 and is so held as to prevent accidental displacement. After the reinforcement rods and the several glasses have been assembled as described, they are supported in any suitable manner and the plastic cement is filled therearound, completely embedding and enveloping the reinforcement, and filling into the irregularities in the glass so as to prevent the same from turning and from moving either upward or downward.

The glasses are accurately spaced apart and immovably held by the rods of the reinforcement while the cement is floated and filled therearound. With each glass bearing against all four boundaries of space 3, it is impossible for it to move laterally in any direction, and with the boundary-forming rods impinged and crowded by bulges 10 and engaged above and below by flange 8 and lugs 9, it is impossible for the glass to turn or tilt during the cementing operation. Means are thus provided for holding the glass fixed in absolutely accurate position, thus insuring an even finished surface. The intertwined mesh-forming rods, which have a tight fit between flange 8 and lugs 9, provide an exceptionally strong reinforcement for the cement and at the same time directly sustain each and every glass, preventing them from being forced downward through the cement under excessive weight or pressure.

It is obvious that glasses of different shapes may be used, and that the construction may be varied in other particulars without departing from the invention as defined by the appended claims.

I claim:—

1. The combination of a resilient reinforcement having angular openings, and circular glasses each having a portion adapted to bear upon the reinforcement, and bulges beneath said portion adapted to enter the corners of the opening and when turned bear outwardly against the walls of the opening.

2. The combination of reinforcing rods arranged crosswise with relation to each other to form square glass-receiving openings, the rods being woven together in mesh form and providing a reinforcement of the thickness or depth of two of the rods, and glasses adapted to be secured in the square openings of the reinforcement, each glass having lateral projections spaced apart vertically a distance equal to the thickness or depth of the reinforcement, the uppermost projection being adapted to bear against the top of the reinforcement, and the under projections consisting of lugs adapted to be disposed toward the corners of the reinforcement opening when the glass is inserted and when the glass is turned adapted to bear against the under side of the reinforcement.

3. The combination of reinforcing rods arranged to form square glass receiving spaces, a circular glass having a flange adapted to rest on the top of the rods, lugs projecting from the glass beneath the flange for passing beneath the rods, the glass being bulged above the lugs for the purpose described.

4. The combination of resilient rods spaced apart to form glass receiving spaces, and glasses formed with lateral enlargements, the glasses being adapted to enter between the rods when the enlargements are not disposed toward the same, the enlargements being adapted when the glasses are turned to impinge the rods and be thus held therebetween.

In testimony whereof I affix my signature in presence of two witnesses.

JULIUS BAKER.

Witnesses:
  J. M. NESBIT,
  MARGARET HUGHES.